United States Patent
Lavigne et al.

(10) Patent No.: US 7,437,083 B2
(45) Date of Patent: Oct. 14, 2008

(54) WAVELENGTH CONVERTER

(75) Inventors: Bruno Lavigne, Antony (FR); Olivier Leclerc, Sainte Geneviève des Bois (FR); Jean-Luc Moncelet, Sainte Genevieve des Bois (FR); Alex Bombrun, Sarras (FR); Jean-Baptiste Pomet, Nice (FR); Fabien Seyfert, Nice (FR)

(73) Assignee: ALCATEL, Paris (FR)

( * ) Notice: Subject to any disclaimer, the term of this patent is extended or adjusted under 35 U.S.C. 154(b) by 474 days.

(21) Appl. No.: 10/937,575

(22) Filed: Sep. 10, 2004

(65) Prior Publication Data

US 2005/0058458 A1 Mar. 17, 2005

(30) Foreign Application Priority Data

Sep. 12, 2003 (EP) .................................. 03292257

(51) Int. Cl.
*H04B 10/02* (2006.01)

(52) U.S. Cl. ........................ 398/176; 398/175; 398/177; 398/178; 398/180; 398/154; 398/155; 398/33; 398/37; 398/38; 398/25; 398/26; 398/27; 398/147; 398/149; 398/158; 398/159; 398/161; 398/81; 398/82; 398/152; 398/79; 398/93; 398/94; 359/332; 359/326; 359/333; 359/344; 359/327; 359/328; 359/337; 359/341.1; 385/1; 385/2; 385/4; 385/5; 385/15; 385/122; 385/123; 385/24; 385/27; 385/14

(58) Field of Classification Search ................ 398/175, 398/176, 177, 33, 25, 26, 27, 37, 38, 147, 398/158, 159, 81, 82, 93, 94, 178, 148, 149, 398/154, 155, 161, 152, 79, 180; 359/326, 359/332, 333, 344, 327, 328, 330, 337, 341, 359/245; 385/122, 1, 2, 4, 5, 15, 11, 14, 385/27, 24, 123

See application file for complete search history.

(56) References Cited

U.S. PATENT DOCUMENTS

| 5,978,129 | A | 11/1999 | Jourdan et al. |
| 6,067,180 | A * | 5/2000 | Roberts ...................... 398/201 |
| 6,337,762 | B1 | 1/2002 | Ueno |
| 6,859,307 | B2 * | 2/2005 | Takeda et al. ............... 359/337 |
| 7,057,785 | B2 * | 6/2006 | Webb et al. .................. 359/245 |
| 2003/0021514 | A1 * | 1/2003 | Ito et al. ........................ 385/11 |

FOREIGN PATENT DOCUMENTS

EP 1 280 289 A2 1/2003

OTHER PUBLICATIONS

T. Ito et al, "Bit rate and format independent PMD compensation with differential group delay monitoring using SOA/ PLC hybrid integrated wavelength converter", Electronics Letters, IEE Stevenage, GB, vol. 39, No. 1, Jan. 9, 2003, pp. 84-86, XP006019536.

(Continued)

*Primary Examiner*—Hanh Phan
(74) *Attorney, Agent, or Firm*—Sughrue Mion, PLLC

(57) ABSTRACT

A wavelength converter for binary optical signals includes an interferometer structure (110) for generating an output signal by modulating a received local signal (LS) according to the modulation of a fUrther received first input signal (IS 1). When such interferometer structures (110) are operated in a standard mode it is known in the art to control the power of the input signal such that the extinction ratio of the output signal is kept minimal. The invention also controls the power of the input signals to achieve the minimal extinction ratio when the wavelength converter and in particular the interferometer structure (110) is operated in a differential mode receiving two input signals.

7 Claims, 3 Drawing Sheets

OTHER PUBLICATIONS

Y. Ueno et al, "Control Scheme for Optimizing the Interferometer Phase Bias in the Symmetric-Mach-Zehnder All-Optical Switch", IEICE Transactions on Electronics, Institute of Electronics Information and Comm. Eng., Tokyo, Japan, vol. E86-C, No. 5, May 2003, pp. 731-740, XP001172351.

H. Chen et al, "All-Optical Logic XOR Using Differential Scheme and Mach-Zehnder Interferometer", Electronics Letters, IEE Stevenage, GB, vol. 38, No. 21, Oct. 10, 2002, pp. 1271-1273, XP006018956.

* cited by examiner

WAVELENGTH CONVERTER

BACKGROUND OF THE INVENTION

The invention is based on a priority application EP03292257.7 which is hereby incorporated by reference.

The invention relates to a wavelength converter for binary optical signals.

Such wavelength converters are for example known from the U.S. Pat. No. 5,978,129. The wavelength converter disclosed therein comprises an interferometer structure, in particular a Mach-Zehnder interferometer. Such an interferometer substantially comprises a parallel connection of a first and a second semiconductor optical amplifier SOA between its input for a local signal and its output. The interferometer serves for generating the output signal by modulating the received local signal according to the modulation of a further received first input signal. This is achieved by providing said first input signal to said first or said second SOA. Explained in more detail, the modulation of the first input signal represents a modulation of power. When such a modulation of power is provided to one of said SOAs the gain thereof is modulated in response to the modulation of the power of the input signal. Because there is a linear relationship between the gain and the phase of such a SOA, the phase of said SOA also changes in response to the modulation of the input power. Simultaneously with the change of the phase of one SOA also the relationship of the phases between the two SOAs changes in such a way, that the phase difference between said two SOAs is about 180°.

In that way an output signal of said interferometer structure is generated by modulating the received local signal according to the modulation of the further received first input signal. The known wavelength converter further comprises a first pre-amplifier means for amplifying said first input signal before it is input to said interferometer structure. Finally, the wavelength converter comprises a control means for controlling the gain of said pre-amplifier means in response to the output signal such that the extinction ratio of the output signal is kept maximal.

When the wavelength converter is embodied as described above and in particular in the way that the interferometer structure only receives one input signal besides the local signal the interferometer structure is operated in a standard mode.

However, the interferometer structure may also be operated in a differential mode at higher data rates than in the standard mode. The operation at higher data rates is achieved in the differential mode by providing a second input signal to the second SOA of the interferometer and by modulating the modulation of the second input signal onto the local signal, too.

As known from the U.S. Pat. No. 5,978,129 the control means of the wavelength converter serves for keeping the extinction ratio of the output signal maximal. Now, one could think of providing a copy of said known control means for additionally controlling said second signal in a same manner in order to keep the extinction ratio of the output signal of the wavelength converter maximal in the differential mode. However, that does not work because the sensitivity of the first and the second SOA to polarization are different and leads to an unsatisfactory operation of both SOAs and consequently to an undesired output signal having not a maximal extinction ratio.

Starting from that prior art it is the object of the invention to improve the controlling of the interferometer structure of a known wavelength converter such that a satisfactory operation of the SOAs of the interferometer is achieved, even if the interferometer structure is operated in a differential mode.

SUMMARY OF THE INVENTION

This object is achieved by the subject matter of claim 1. In particular this object is solved by a wavelength converter for binary optical signals, comprising an interferometer structure, in particular a Mach-Zehnder interferometer, for generating an output signal by modulating a received local signal according to the modulation of a further received first input signal; a first pre-amplifier means for amplifying said first input signal before it is input into said interferometer structure, a first control means for generating a first feedback signal to control the gain of said first preamplifier means in response to a first error signal derived from the output signal and representing the slope of the transfer function of the interferometer structure for the first input signal, the wavelength converter being characterized in that the interferometer structure is operated in a differential mode additionally modulating the local signal according to the modulation of a received second input signal, a second pre-amplifier means is provided for amplifying said second input signal before it is input to said interferometer structure, a second control means is provided for generating a second feedback signal to control the gain of said second pre-amplifier means in response to a second error signal derived from the output signal and representing the slope of the transfer function of the interferometer structure for the second input signal; the first and the second control means are interconnected such that the gain of each of the first and for the second pre-amplifier is controlled under consideration of both the first and the second error signal.

Because of the claimed interconnection between the first and the second control means the controlling of the first and the second input signal is not done independently but under consideration of both, first and the second error signal. This interconnection leads to a satisfactory operation of the interferometer structure in the differential mode, i. e. when operating at high data rates; in particular the output signal of said interferometer shows a satisfactory maximal extinction ratio.

In the differential mode the first and the second input signals are preferably delayed with respect to each other.

The interferometer structure comprises a parallel connection of a first and a second semiconductor optical amplifier SOA. Advantageously, the claimed interconnection of the first and the second control means of the wavelength converter serve for satisfactory operation of said SOAs and allows to use low speed SOAs at higher bit rates in a realistic system configuration hence opening the way of key network functionalities such as wavelength conversion and regeneration to data rates >10 Gbit/s. Preferred embodiments of the claimed wavelength converter and in particular of the interconnection between the first and second control means is provided in the dependent claims.

The above object is further solved by the claimed method. The advantages of said method correspond to the advantages mentioned above for the claimed wavelength converter.

BRIEF DESCRIPTION OF THE DRAWINGS

There are 4 figures accompanying the description, wherein.

In the following embodiments of the invention are described in detail by referring to the above-identified figures.

Figure 1:
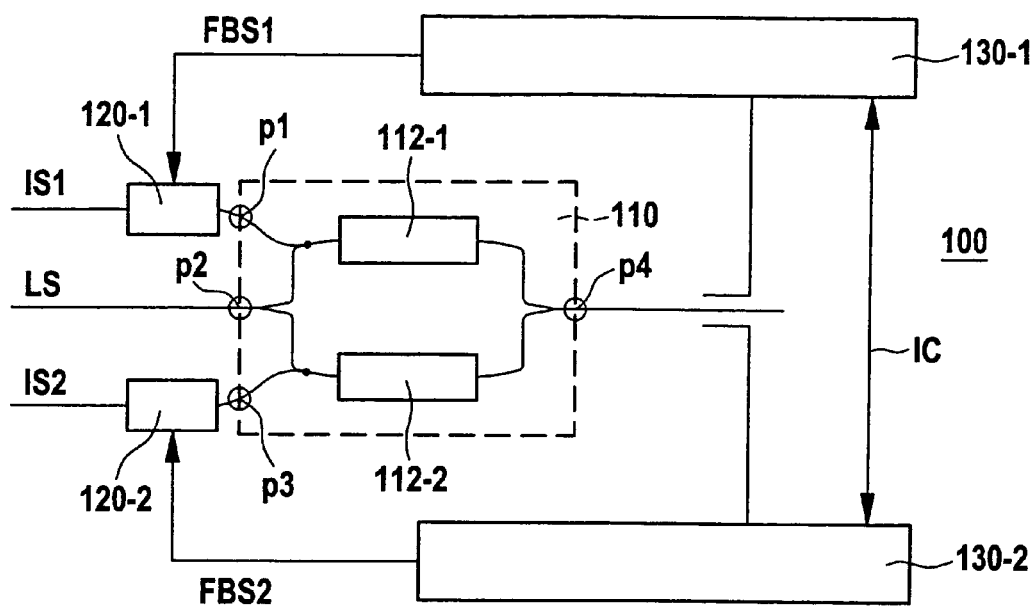
FIG. 1 shows a wavelength converter having an interferometer structure being operated in a differential mode.

FIG. 1 shows a wavelength converter 100 according to the invention for processing binary optical signals. It comprises an interferometer structure 110, in particular a Mach-Zehnder interferometer. That interferometer structure 110 comprises three input ports p1, p2, p3 and one output port p4. The second input port p2 is connected to the output port p4 via a parallel connection of a first and a second semiconductor optical amplifier SOA 112-1 and 112-2. At said second input port p2 the interferometer structure 110 receives a local signal LS. At its first input port p1 the interferometer structure 110 receives a first input signal IS1, which is forwarded to the first SOA 112-1. When being operated in a standard mode the interferometer structure does typically not receive any input signal at its third port p3. However, when being operated in a differential mode the interferometer structure 110 receives a second input signal IS2 at its third input port p3.

Figure 2:
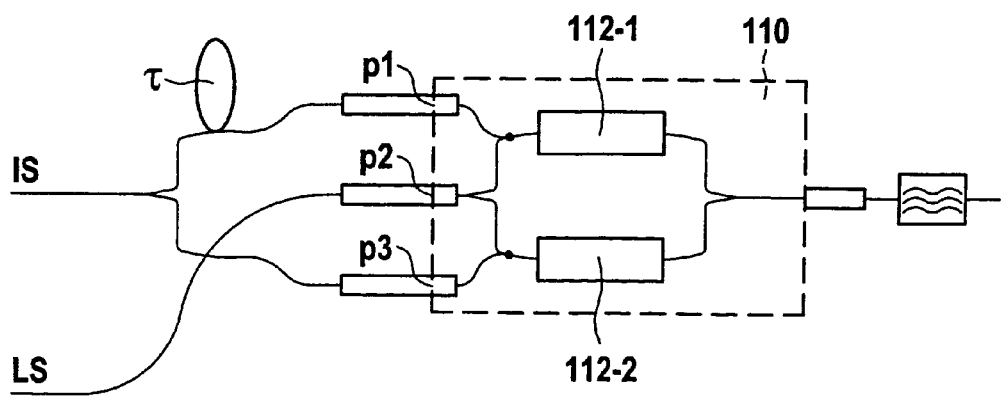
FIG. 2 shows the interferometer structure in more detail.

FIG. 2 shows said interferometer structure 110 being operated in the differential mode in more detail. Identical components and signals are assigned in FIGS. 1 and 2 with the same reference numerals. FIG. 2 shows a specific embodiment of connecting signals to the interferometer structure 110 when being operated in the differential mode. More specifically, the first and the second input signals are identical except for a delay. That delay is indicated in FIG. 2 by a loop τ. When the interferometer 110 is operated in the differential mode it is enabled to operate at higher bit rates as in the standard mode and hence opening the way for key network functionalities such as wavelength conversion and regeneration to data rates >10 Gbit/s.

Referring back to FIG. 1 it can be seen that the wavelength converter 100 further comprises a first and a second pre-amplifier means 120-1, 120-2 for amplifying the first and the second input signal IS1, IS2, respectively, before they are input into said interferometer structure 110, in particular to said first and second SOA, respectively.

Moreover, the wavelength converter 100 includes a first and a second control means 130-1, 130-2 generating a first and a second feedback signal FBS1, FBS2 for controlling the gain of said first and second pre-amplifier means 120-1, 120-2, respectively. For carrying out that control operation both control means 130-1, 130-2 are interconnected with each other as will be described below in more detail and as indicated in FIG. 1 by the arrow IC. That interconnection leads advantageously to a maximization of the extinction ratio of the output signal.

Figure 3:
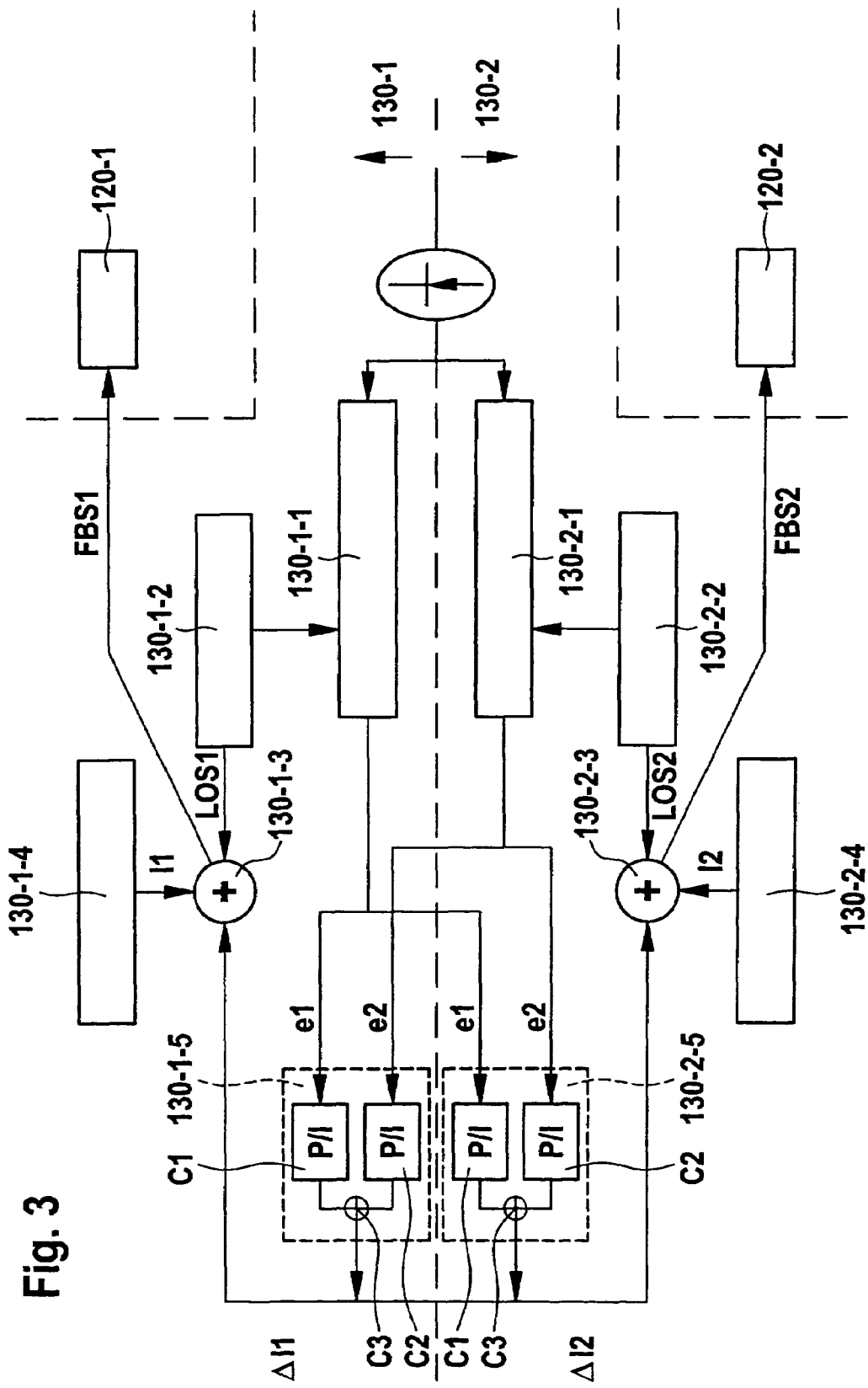
FIG. 3 shows the embodiment of the control means of the wavelength converter according to the invention.

FIG. 3 shows the hardware architecture of the first and the second control means 130-1, 130-2 for achieving this effect in more detail. From FIG. 3 it is apparent that each of the first and the second control means comprises a detection means, in particular a lock-in detection means 130-1-1, 130-2-1, for generating an error signal e1, e2 representing an error corresponding to the deviation of the incident mark level, with respect to the minimum of the interferometer transfer function or of a "0" level, of the output signal from zero. More specifically, the error signal e1 generated by the first control means represents the slope of the transfer function of the interferometer structure 110 at the operating point of the first input signal, whereas the second error signal e2 represents the slope of the transfer function of the interferometer structure 110 at the operating point of the second input signal. For deleting or avoiding these errors in the output signal the first and the second control means 130-1, 130-2 further comprise a first and a second regulator means 130-1-5, 130-2-5 for generating a first and a second control current $\Delta I_1$, $\Delta I_2$, respectively. The first and the second control means further comprise a first and a second current source 130-1-4, 130-2-4 for providing a first and a second static current I1, I2 and a first and a second local oscillator 130-2-2, 130-1-2 for generating a first and a second local oscillating signal at local frequencies f1, f2, respectively. These local oscillating signals are provided to the detection means 130-1-1, 130-2-1 enabling them to work correctly.

Finally, each of said first and second control means 130-1, 130-2 include first adders 130-1-3, 130-2-3 for generating the feedback signals for controlling the gain of the co-ordinated first and second pre-amplifier 120-1, 120-2, respectively. Said first and second feedback signals are generated by said adders by adding said first and second control currents ΔI1, ΔI2, said first and second static currents I1, I2 and oscillating signals LOS1, LOS2, respectively.

As mentioned above, the described control means 130-1, 130-2 are embodied to maximize the extinction ratio of the output signal. The way this is achieved is described below by referring to FIG. 4.

Figure 4:
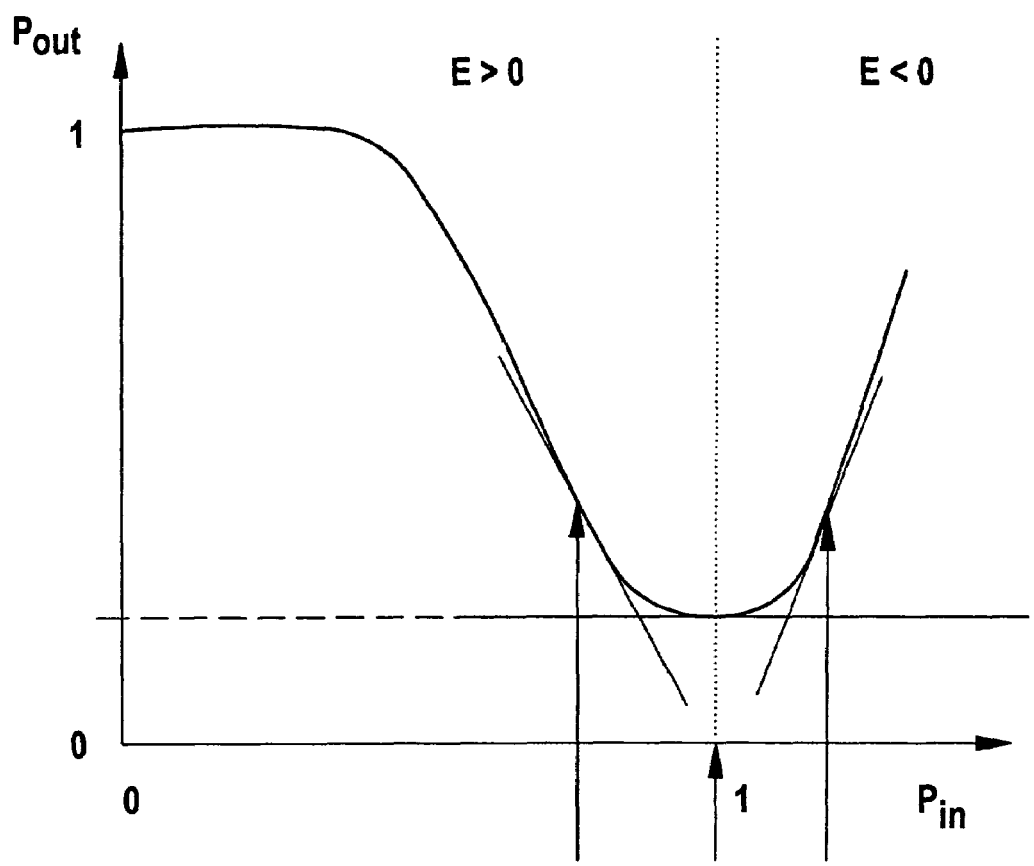
FIG. 4 shows the transfer function of an interferometer structure.

FIG. 4 shows the transfer function of the interferometer structure. This transfer function illustrates the power of the signal output by said interferometer $P_{out}$ over the power of the input signal $P_{in}$. From FIG. 4 it can be taken that this transfer function has a minimum. For understanding FIG. 4 it must be considered that the power of a binary signal is represented by the power of its mark levels, "1", whereas its space levels, "0", do not transfer any power. The interferometer operates as an inverter. Thus, it is important for a correct operation of the wavelength converter to keep the power of the mark level of the incoming data of the input signal IS at the minimum of the transfer function. Only in that case a mark level of the input signal is converted into a space level having a minimum power in the output signal. In that case a proper detection of the corresponding level in the output signal is possible. Any deviation of the incoming mark level from the minimum of the transfer function in FIG. 4 will induce an unsatisfactory operation of the SOA. This deviation would lead to an operating point corresponding to a positive or a negative slope with said transfer function. An operating point with a positive slope is represented by the vertical arrow on the right-hand side of the minimum and an operating point with a negative slope is represented by the vertical arrow on the left-hand side of the mark level "1" in FIG. 4.

Consequently, the first and the second control means 130-1, 130-2 are embodied to keep the mark level of the incoming data at the minimum of the transfer function. In order to achieve this, the detecting means 130-1-1, 130-2-1 are embodied to detect the actual slope of the power of a space mark level, "0" of the output signal and to generate a corresponding error signal. Finally, the feedback signals are generated by said control means for controlling the co-ordinated pre-amplifiers in such a way that the operating point of the mark levels of the incoming data is led back to a minimum of the transfer function. This corresponds to a maximum of the extinction ratio of the output signal. In particular, if a positive slope is detected, the feedback signal is embodied to decrease the power or the current of the co-ordinated input signal and vice versa. However, when operating the interferometer structure in a differential mode, it is important that these feedback signals are not generated by only considering the error signal of the co-ordinated detection means but also of the other detection means. More specifically, the feedback signal generated by the first control means must not only be generated under consideration of the error signal e1 generated by the first detection means 130-1-2 but also of the error signal e2 generated by the second detection means 130-2-1 of the second control means 130-2. Analogously, the feedback signal output by the second control means 130-2 must also be generated under consideration of both error signals e1 and e2.

That interconnection of the first and second control means 130-1, 130-2 is done in the regulator means 130-1-5, 130-2-5. Each of said regulator means comprises a first control unit C1 for generating a first component of the control current ΔI aiming to delete the error represented by the first error signal e1 output by the detection means 130-1-1 of the first control means 130-1. The regulator means further comprise a second control unit C2 for generating a second component of the control current ΔI aiming to delete the error represented by the second error signal e2 output by the detection means 130-2-1 of the second control means 130-2. Finally, each regulator means 130-1-5, 130-2-5 comprises an adder unit C3 for generating the control current $\Delta I_1$, $\Delta I_2$ by adding its first and its second component together. The first and second control units C1, C2 may be embodied as proportional P or as proportional/integral P/I-controller.

The invention claimed is:

1. A wavelength converter for binary optical signals, comprising:
   an interferometer structure, in particular a Mach-Zehnder interferometer, for generating an output signal by modulating a received local signal according to the modulation of a further received first input signal;
   a first pre-amplifier means for amplifying said first input signal before it is input into said interferometer structure; and
   a first control means for generating a first feedback signal to control the gain of said first pre-amplifier means in response to a first error signal derived from the output signal and representing the slope of the transfer function of the interferometer structure for the first input signal; with
   the interferometer structure operating in a differential mode additionally modulating the local signal according to the modulation of a received second input signal;
   a second pre-amplifier means providing for amplifying said second input signal before it is input to said interferometer structure;
   a second control means providing for generating a second feedback signal to control the gain of said second pre-amplifier means in response to a second error signal derived from the output signal and representing the slope of the transfer function of the interferometer structure for the second input signal;
   the first and the second control means interconnecting that the gain of each of the first and for the second pre-amplifier is controlled under consideration of both the first and the second error signal.

2. A wavelength converter according to claim 1, wherein the first and the second input signal are preferably identical, except for a delay.

3. A wavelength converter according to claim 1, wherein the interferometer structure comprises 3 input ports and 1 output port, with
   the second input port connecting to the output port via a parallel connection of a first and a second semiconductor optical amplifier SOA and receives the local signal;
   the first input port serving for inputting the first input signal to said first SOA; and
   the third input port serving for inputting the second input signal to said second SOA.

4. A wavelength converter according to claim 1, wherein each of the first and the second control means comprises:
   a detection means for generating one of said error signals both representing an error in the form of a deviation from zero in the slope of the power of a space level of the output signal;
   a regulator means for generating a control current aiming to delete said error;
   a current source for providing a static current;
   a local oscillator for generating a local oscillating signal at a local frequency; and
   a first adder for generating one of said feedback signals for controlling the gain of the co-ordinated pre-amplifier means by adding said control current, said static current and said oscillating signal.

5. A wavelength converter according to claim 4, wherein each regulator means comprises:
   a first control unit for generating a first component of the control current aiming to delete the error represented by the first error signal output by the detection means of the first control means;
   a second control unit for generating a second component of the control current aiming to delete the error represented by the second error signal output by the detection means of the second control means; and
   an adder unit for generating the control current by adding its first and its second component together.

6. A wavelength converter according to claim 5, wherein the first or the second control unit is embodied as proportional or as proportional/integral P/I-controller.

7. A method for operating a wavelength converter for optical signals, wherein the wavelength converter comprises a differential interferometer structure for generating an output signal by modulating a received local signal according to further received first and second input signals, comprising the steps of:
   generating first and second error signals representing the slope of the transfer function of the interferometer structure for said received first and second input signals, respectively;
   independently controlling the power of the first and second input signals in response to respective first and second feedback signals, wherein each of the first and second feedback signals is derived from both of the first and the second error signals.

* * * * *